Sept. 4, 1928.  1,683,019
J. E. BODA
UNIVERSAL AGRICULTURAL IMPLEMENT
Filed June 11, 1923  4 Sheets-Sheet 1
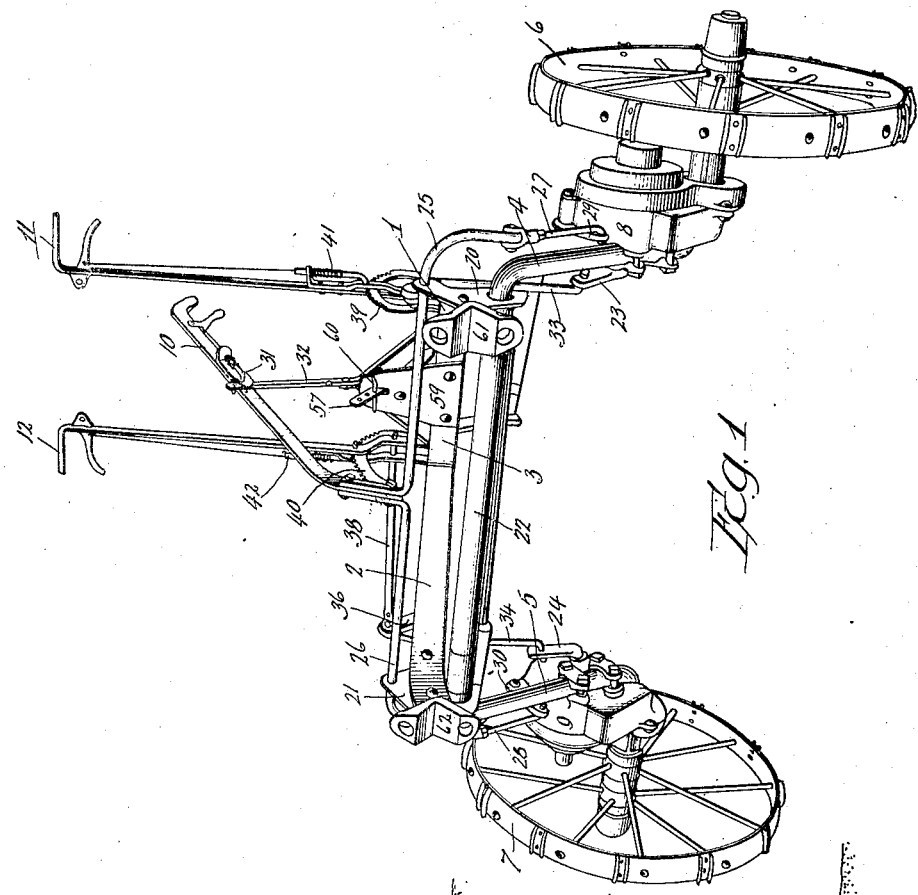
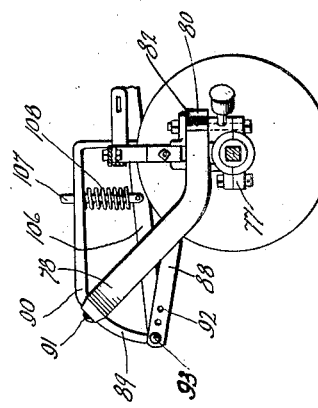
Inventor:
Joseph E. Boda

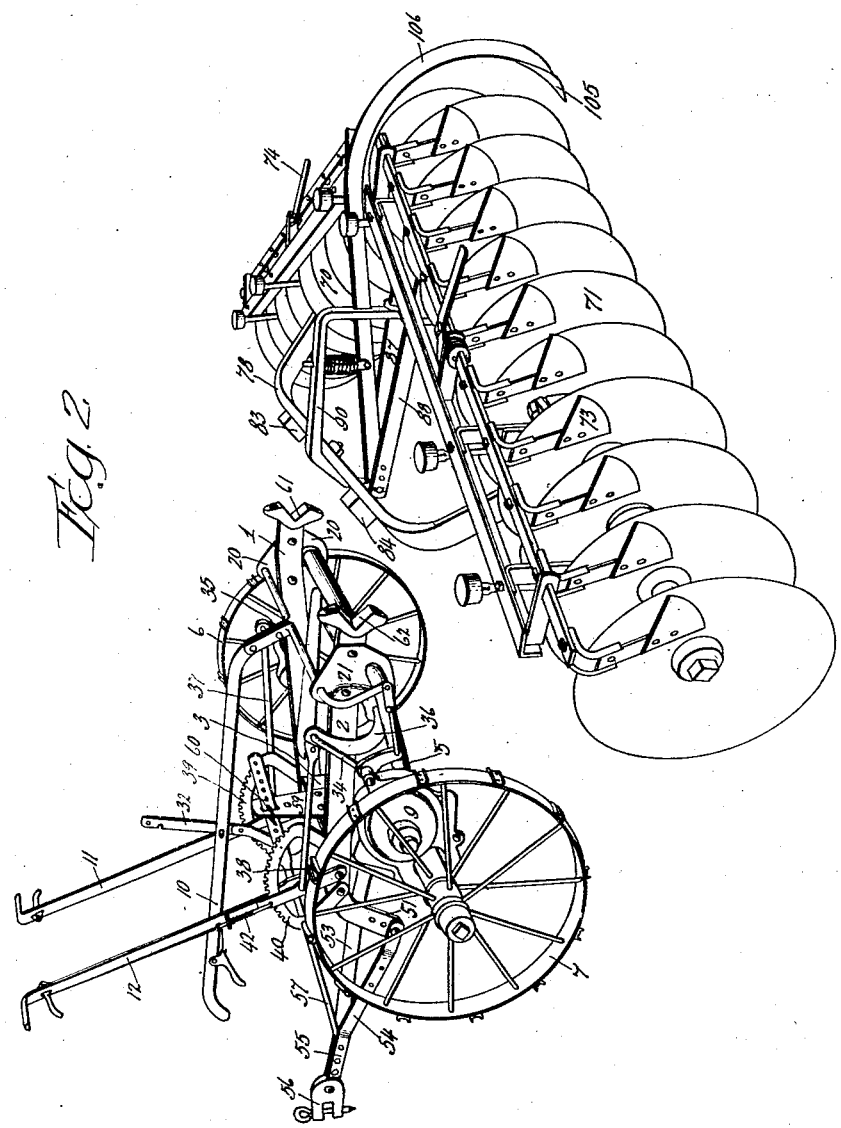

Sept. 4, 1928.  1,683,019
J. E. BODA
UNIVERSAL AGRICULTURAL IMPLEMENT
Filed June 11, 1923   4 Sheets-Sheet 3
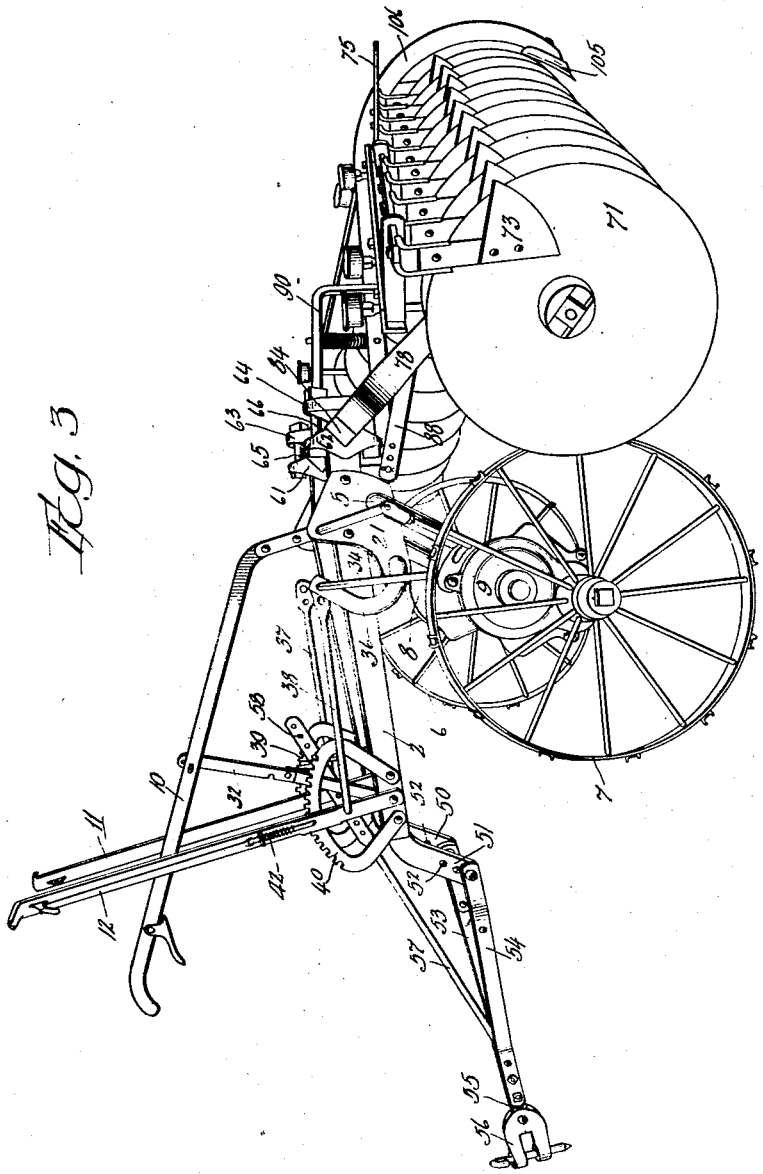
Inventor
Joseph E. Boda
by L.C. Shonts   Atty.

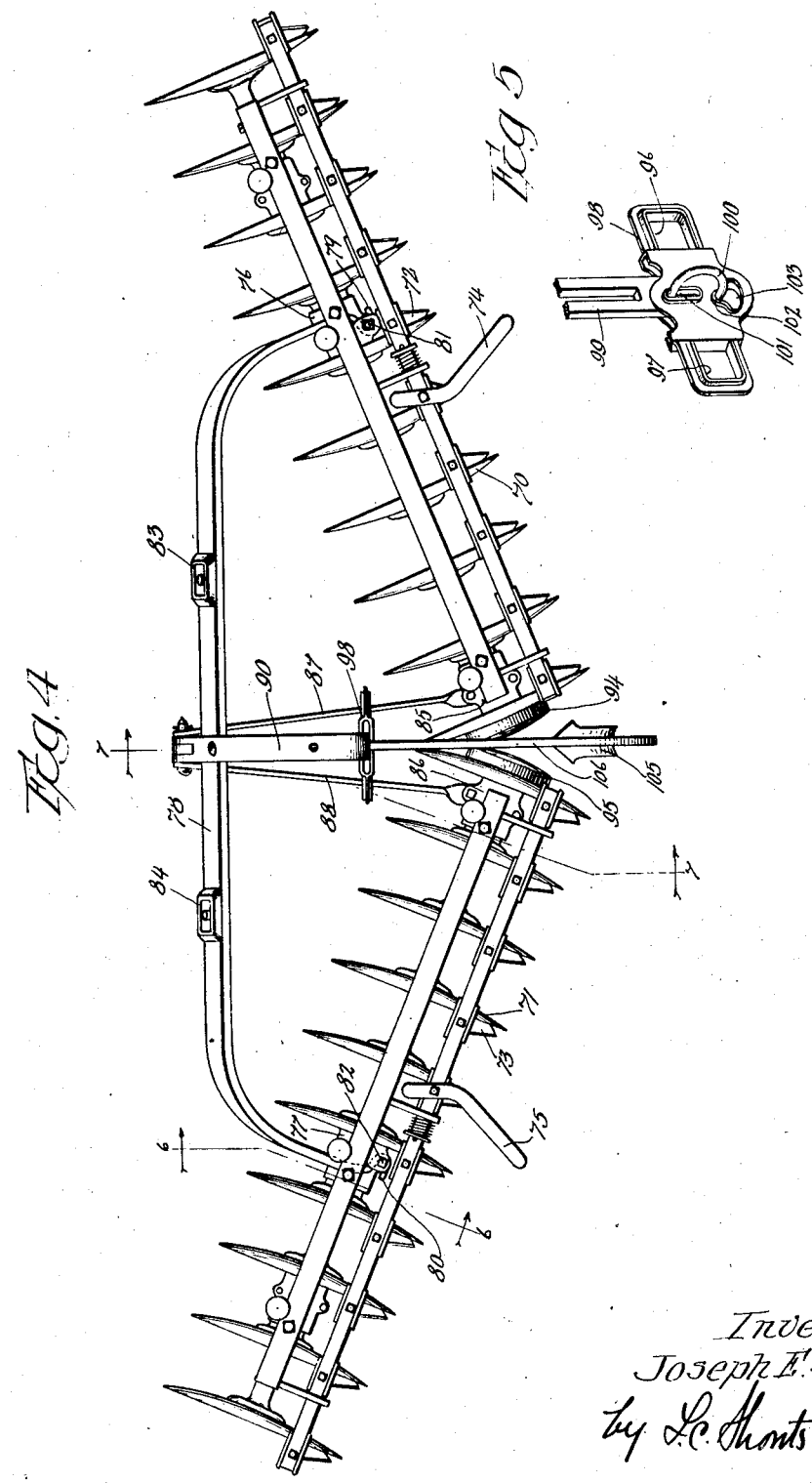

Patented Sept. 4, 1928.

1,683,019

UNITED STATES PATENT OFFICE.

JOSEPH E. BODA, OF MOLINE, ILLINOIS, ASSIGNOR, BY MESNE ASSIGNMENTS, TO MOLINE IMPLEMENT COMPANY, A CORPORATION OF ILLINOIS.

UNIVERSAL AGRICULTURAL IMPLEMENT.

Application filed June 11, 1923. Serial No. 644,581.

This invention relates to a universal agricultural implement.

The tool illustrated and described in connection with the invention is a disc harrow but it will be understood that the invention is not limited to its combination with this tool.

It has been the practice in the agricultural industry to use a separate implement for each different kind of work. This has required an enormous number of different machines because of the different kinds of soil, the wide variety of crops to be raised, and the variety of operations to be performed in connection with each crop. Each of these machines usually has supporting wheels, a frame, adjusting levers and other mechanisms, all of which are similar in many respects. In addition to the enormous number of tools required to meet the conditions above mentioned, the introduction of the tractor for farming purposes has resulted in the production of a different line of implements suitable for connection to a tractor but not useful with horses. Here again there has been a duplication of parts such as wheels, frames, levers, etc., all of which add greatly to the expense of farming.

The present invention is directed to a solution of the problem by the elimination of this duplication of parts. It is proposed to provide one draft carriage that can be easily connected to various tool units. The problem of providing such a draft carriage is not simple because of the many different operations that must be performed and because of the many different conditions that must be met that require different adjustments of the machine. For example, the machine must be suitable for plowing, which is relatively heavy work. It must also be useful for harrowing, listing, planting, cultivating, harvesting and for many other purposes in connection with special crops. It must be operable on side hills, in different kinds of soil, and it should be constructed so that it can be drawn by either horses or a tractor.

The general object of the invention is to provide an improved universal agricultural implement.

A more specific object is to provide a universal draft carriage which can be attached to various tool units, such draft carriage to be capable of lifting the tool unit, to be adjustable so as to vary the position of the tool unit, and to be constructed so that the weight of the parts can be thrown on the tool unit or removed from the tool unit in varying degrees.

In addition to the general objects of the invention a specific object of the combination disclosed is to provide an improved disc harrow.

Other objects and advantages of the invention will appear from the specification and drawings.

An embodiment of the invention is illustrated in the drawings in which

Figure 1 is a rear perspective view of the draft carriage.

Figure 2 is a perspective view of the draft carriage in operating position, illustrating the disc harrow tool unit disconnected from it but in position to be attached to it.

Figure 3 is a perspective view of the carriage with the disc harrow tool unit connected to it, showing the machine in elevated position.

Figure 4 is a plan view of the disc harrow tool unit.

Figure 5 is a perspective view of a mechanism for controlling the relative movement of the disc gangs.

Figure 6 is a section of a disc harrow unit on the line 6—6 of Figure 4.

Figure 7 is a section of the disc harrow unit on the line 7—7 of Figure 4.

The draft carriage has been made as simple as possible in order to reduce the amount of metal used in its manufacture and to facilitate manufacturing operations as well as to reduce the cost of inventories in raw material and finished goods that must be kept in stock. At the same time, it has been made rigid and durable so that it can be used for heavy work such as plowing as well as for light work such as cultivating. It has been made adjustable so that it can be used for work requiring different adjustments of the wheels as in plowing where one wheel must be higher than the other. It has been made "frameless", that is, it does not include a frame supported on wheels with various parts moving relative to the frame.

The carriage has two draft bars 1 and 2 connected together at their forward end by a cross brace 3. A hitch mechanism is connected to the front ends of the draft bars and their rear ends are adapted to be connected to a tool unit. The draft bars are supported near their rear ends by crank axles 4 and 5 on which are journalled ground wheels 6 and 7. Powerlift mechanisms 8 and 9, operated by power from the land wheels, serve to swing the crank axles relative to the draft bars to raise and lower them. The powerlift mechanisms are controlled by a lever 10 and they are adjusted by means of levers 11 and 12. All of the control levers are located so that they may be easily manipulated by an operator from a tractor or other source of draft power to which the carriage may be connected.

The crank axles 4 and 5 are journalled in bearings 20 and 21 attached to the draft bars 1 and 2 respectively. The inner ends of the crank axles are received within a sleeve 22 in which they rotate independently of one another. The ground wheels 6 and 7 are journalled loosely on the crank axles and may be of any suitable type.

A powerlift mechanism is provided for each crank axle in order to relieve the machine of any strain that might be caused by having a powerlift on only one axle. These powerlift mechanisms are alike except that one is right and the other left-handed. They are operated by power from their respective ground wheels and are of the type described in Patent No. 1,587,648, June 8, 1926, to which reference is made for details. In general, the powerlift mechanisms are of the type having one clutch member rotated continuously by the ground wheel and a second clutch member rotated intermittently through a definite cycle of movement whenever connected to the first member. The intermittently rotatable clutch members rotate the cranks 23 and 24 respectively. These cranks are shown in the raised position of the machine in Figure 1. When the powerlifts are tripped into operation, they move through a cycle of movement and automatically stop with the cranks in a position substantially 180 degrees from that illustrated in Figure 1. The powerlifts lock the cranks in their respective positions to hold the carriage either raised or lowered, and they are constructed so that they will move through only one cycle of movement when the controlling lever 10 is moved from one of its positions to another, that is, when the lever 10 is moved from one position to the other, the powerlifts will operate through one cycle regardless of whether both wheels are moving forward at the instant the lever is operated or not, and there is no possibility of one powerlift remaining permanently in one position while the other moves to another.

The controlling means for the powerlift mechanism is constructed so that both mechanisms will be set into operation simultaneously. The lever 10 is connected to cranked shafts 25 and 26, the ends of which are pivoted to links 27 and 28 that are, in turn, pivoted to tripping levers 29 and 30. The lever 10 has a latch 31 cooperating with a bar 32 pivoted to the draft bars so that it has a limited movement to accommodate the movement of the latch 31 which follows the path of an arc when the lever 10 is moved from one position to another. The rigid connection between the control lever and the powerlift tripping levers insures that both powerlifts will be tripped into operation simultaneously.

The cranks 23 and 24 of the powerlifts are connected by links 33 and 34 to curved links 35 and 36 pivoted in the bearing plates 20 and 21 on draft bars. These linkage mechanisms are adjustable through the medium of the levers 11 and 12 which are connected to the links 35 and 36 by links 37 and 38 respectively, the connection being at the point where the links 33 and 34 are pivoted to the links 35 and 36. The levers 11 and 12 are pivoted to the draft bars 1 and 2 respectively and operate over sectors 39 and 40, the levers being provided with latches 41 and 42 for holding them in position on the sectors.

The height of the sides of the carriage can be varied by means of the levers 11 and 12 which are effective for this purpose when the carriage is lowered in operative position where such adjustments are desired. The construction is such that the carriage is always raised to a level position and to substantially the same height above the ground regardless of what the adjustment of the levers 11 and 12 may be. For example, referring to Figure 2, if the lever 12 is pushed backward, or clockwise, the link 36 will swing on its pivot and pull the link 34 longitudinally, thereby moving the crank axle 5 to lower that side of the carriage. The corresponding action takes place when the lever 11 is adjusted with the parts in the position shown in Figure 2. If the levers are adjusted when the carriage is raised, as shown in Figure 3, the position of the crank axles will not be changed. For example, if the lever 12 is pushed backward, the link 36 will swing on its pivot, but the only effect this will have on the link 34 is to swing it through a small portion of the top of its arc. In other words, the link 34 is not moved vertically to any noticeable extent and, consequently, the crank axle 5 is not moved. It follows that the carriage will be raised to substantially the same height for all adjustments of the lever 12 because, while these adjustments change the position of the crank axle 5 when the carriage is lowered, they have no effect on the height of the carriage when it is raised, and the carriage will be in substantially the same height position when it is raised for all adjustments of lever 12. It follows further that the carriage will be raised to a level position because, even though the levers 11 and 12 are adjusted to different position, the height of the carriage for the various adjustments is the same.

This is an important advantage in that the tools are always raised sufficiently high for transport purposes and they are raised to a level position even though the carriage may have been inclined while working.

The forward ends of the cross brace 3 are bent downwardly at 50 and 51 and are provided with a series of holes 52 for the reception of the bars 53 and 54 of the hitch device. The bars 53 and 54 converge forwardly and are connected together and to a releasable hitch member 55 which, in turn, is connected to a clevis 56 used for hitching the carriage to a tractor, or a horse-drawn cart, or the like. Pivoted between the forward ends of the bars 53 and 54 is a link 57 having a flattened end provided with a series of holes 58. This bar extends through a slot in the member 59 attached to the cross brace 3. A U-shaped stop member 60 is provided which may be positioned in various of the holes 58 and which cooperates with the member 59 to make the hitch device rigid for a purpose which will be later described.

The rear ends of the draft bars 1 and 2 are forged at 61 and 62 to fit around portions of a tool unit. This forged construction provides a bearing surface for grasping the tool unit and it makes an unusually rigid, durable and strong connection, avoiding the difficulties of welded constructions or brackets bolted on to the draft bars. The tool units are connected to the draft bars by means of clamping member 63 and 64 and bolts 65 and 66, illustrated in Figure 3. This connection holds the tool unit rigidly in place and, at the same time, permits it to be easily attached and detached as well as adjusted.

The tool unit illustrated is a disc harrow comprising two disc gangs 70 and 71 each made up of a plurality of discs mounted on a common axle. The discs are positioned to throw the dirt outwardly from the center and their inner ends are angled toward the rear. The discs of each gang are provided with scrapers 72 and 73 respectively, adjustable by means of levers 74 and 75. The gangs have central bearings 76 and 77 illustrated in plan in Figure 4 and one of which is illustrated in elevation in Figure 6. Pivoted to these bearings is a connecting bar 78 having hooked ends 79 and 80 which fit over pivot pins 81 and 82 respectively in the bearings 76 and 77. The connecting bar 78 has two blocks 83 and 84 fixed to it at points spaced apart so that the blocks will correspond to the spacing of the draft bars 1 and 2. The thickness of these blocks is such that, together with bar 78, they form a block of metal of substantially square cross section, thereby facilitating the clamping of the connecting bar to the draft bar, as illustrated in Figure 3. It will be understood that the blocks 83 and 84 can be made longer to provide later adjustment on the draft bars. This construction allows the use of a relatively light connecting bar and, at the same time, gives the advantages of a square connection for clamping the connecting bar to the draft bars.

The disc harrow sections are also provided with inner bearings 85 and 86 to which are pivoted the links 87 and 88 extending forwardly and adjustably connected to the downwardly extending end 89 of a bar 90 fixed to the connecting bar 78 at the point 91, as shown in Figures 6 and 7. The links 87 and 88 are provided with a series of holes 92 for the reception of a pin 93 which connects them to the bar 89. By means of this connection, the inner ends of the gangs may be moved to vary the angle of the gangs. It will be noted that the pivots 81 and 82, on which the bar 78 is pivoted, are to the rear of the axes of the disc gangs. Also, the hooked ends of the bar 78 permit the gangs to have a certain amount of longitudinal movement. This location of the pivots 81 and 82 and the construction of the ends of the bar 78 permits the gangs to adjust themselves longitudinally when the links 87 and 88 are adjusted so as to prevent the inner discs from interfering with one another. These inner discs are provided with bumpers 94 and 95 of considerable size to receive the end thrust.

The links 87 and 88 extend through openings 96 and 97 in a member 98, connected to the downwardly extending end 99 of the bar 90 by means of a U-shaped link 100, one arm of which extends through an opening having a narrow portion 102 and a wide portion 103. The arms of the U-shaped link 100 extend through holes in the member 99. This construction allows the inner ends of the gangs to move relative to one another when the harrow is in working position, but it prevents such relative movement when the harrow is in transport position. The position of the parts, when the harrow is in transport, is illustrated in Figure 5. In this position one arm of the link 100 is in the narrow portion of the member 102 in the lower opening in member 98, and the other arm is in the top of the slot 101. The member 98 cannot pivot on the member 99 under these conditions and, consequently, the links 87 and 88 are held rigidly, thereby preventing relative movement of the inner ends of the gangs. When the gangs are in operating position, the lower arm of the member 100 is in the wide portion 103 of the opening in member 98 and the other arm is in the bottom of slot 101. The width of the portion 103 permits the lower arm of the U-shaped member 100 to swing, thereby permitting the member 98 to pivot on the member 99. This allows a limited relative movement of the links 87 and 88, and a relative movement of the inner ends of the gangs.

If it should be desired to hold the inner ends of the gangs rigid while in working position and to permit them to have limited relative movement in transport position, the position of member 98 can be reversed to obtain this reverse action.

A shovel 105 is positioned between the inner ends of the gangs to turn any soil that may be left between the two gangs. This shovel is carried by an arm 106 pivoted on the pin 93. A link 107 is pivoted to arm 106 and extends through a hole in the member 90. A spring 108 biases the arm 106 downwardly to resiliently hold the shovel in the ground.

Assuming that a farmer has the draft carriage heretofore described, the only thing he need to purchase to provide himself with a disc harrow is a pair of gangs with a simple connecting bar. With the disc gangs resting on the ground, he can back the draft carriage up to the harrow unit and quickly connect the two together. As he pulls the draft carriage forward, he can trip the lifting mechanism and raise the gangs clear of the ground to easily transport them. When he reaches the field where he desires to use the harrow, he again trips the lifting mechanism and lowers the disc gangs to operating position. By adjusting the levers 11 and 12 he can throw as much of the weight of the carriage on the gangs as he desires. He can thus regulate the depth of cut for variations in the character of soil in the same field. He can do this easily without stopping the machine and by simply reaching back from his position on the tractor to manipulate the levers 11 and 12. He has available enough weight to cause the disc gangs to penetrate at their maximum angle so that he can turn all the soil for a thorough job of discing. If he desires to raise the disc gangs at the end of the field, or at any point in the field, to clear them, to repair them, or for any other purposes, he can very quickly do so by operating the controlling lever 10, whereupon the discs will be lifted by power to a position where they are easily accessible for cleaning, repair, or inspection.

Another important advantage is that he can adjust the hitch on the carriage to vary the penetration of the gangs. For example, by changing the holes through which the U-shaped stop member 60 is inserted, the front end of the draft carriage can be raised or lowered. During this movement the carriage swings about the pivot of the axes of the crank axles 4 and 5 to the draft bars. If the front end of the machine is pushed down, the rear end will be raised and the discs will be shifted to a shallower working position. On the other hand, if the front end of the draft bars is raised, the discs will be thrown deeper into the ground and they will be rigidly held in that position because the hitch itself is rigid when the U-stop 60 is placed astride the member 59. When the latter adjustment is made, the inner ends of the discs will be thrown deeper into the ground than the outer because the inner ends swing about a longer radius than the outer ends. This compensates for the tendency of the inner ends to ride out of the ground and is an important advantage because, by this adjustment, an even penetration can be secured. If a farmer should desire to use difference types of discing units, he need only provide himself with the different types of disc gangs having suitable connecting bars. In fact, if the disc gangs are provided with proper bearings he can use the same connecting bar for all disc gangs.

The invention has been illustrated in connection with a disc harrow tool unit but it will be understood that other tool units can be connected to the draft carriage in a manner similar to the connection of the disc harrow unit. One draft carriage comprising simple draft bars supported by crank axles, lifted by powerlift mechanism, and adjusted by simple devices, all available for manipulation from a tractor, can be used with a wide variety of agricultural tools. This means an investment in only one carriage instead of an investment in a separate carriage for every agricultural tool. Obviously this not only reduces the manufacturing cost of agricultural tools, but it reduces the cost of them to the farmer and is a real economy in the agricultural implement industry.

When other tools are used, the U-stop 60 can be located either in front or behind the member 59. Usually it is located behind the member 59 so that the hitch is flexible when the carriage is lowered to operating position. As the carriage is raised, the link 57 slides forward, until the stop strikes member 59, whereupon further forward movement is prevented. This converts the hitch into a brace for holding the forward end of the carriage while the lifting mechanism raises the rear end.

It is understood that the structure shown is for purposes of illustration and that variations may be made in it without departing from the spirit and scope of the invention as defined by the claims.

I claim:

1. A frameless, universal, implement carriage adapted to be connected to and to be pulled by a forwardly located source of draft power such as a tractor from which it is to be controlled, comprising tool supporting draft bars having their rear ends arranged to be detachably connected to a variety of agricultural tool units comprising a plurality of tools attached to a common supporting bar, a wheeled support for the draft bars, means for raising and lowering the draft bars, and means for controlling the raising and lowering means having portions located forwardly where they may be easily manipulated by an operator on a source of draft power to which the carriage may be connected.

2. A frameless, universal, implement carriage adapted to be connected to and to be pulled by a forwardly located source of draft power such as a tractor from which it is to be controlled, comprising tool supporting draft bars having their rear ends arranged to be detachably connected to a variety of agricultural tool units comprising a plurality of tools attached to a common supporting bar, crank axles and ground wheels for supporting the draft bars, a powerlift mechanism for each crank axle operated by travel of its respective ground wheel for swinging the crank axles to raise and lower the carriage, controlling means for setting said powerlift mechanisms into operation simultaneously, and separate adjusting means for the powerlift mechanisms to vary the position of the crank axles to vary the height of the sides of the carriage when in working position, said adjusting means and said controlling means having portions located forwardly where they may be easily manipulated by an operator on a forwardly located source of draft power pulling the carriage.

3. A frameless, universal, implement carriage adapted to be connected to a forwardly located source of draft power such as a tractor from which it is to be controlled, comprising tool supporting draft bars having their rear ends arranged to be connected to a variety of agricultural tool units comprising a plurality of tools connected to a common supporting bar, a pair of crank axles having ground wheels for supporting the draft bars, a powerlift mechanism for each crank axle operated by travel of its respective ground wheel to swing the crank axles to raise and lower the carriage, controlling means for setting the powerlift mechanisms into operation simultaneously, connections between the powerlift mechanisms and the draft bars which are coordinated to cause the draft bars to be raised to the same height above the ground and to a level position from every working position when the powerlift mechanisms are operated, adjusting means for each of the powerlift connections, said controlling means and said adjusting means having portions located forwardly where they may be easily manipulated by an operator from a position on a forwardly located source of draft power.

4. A frameless, universal, implement carriage having a draft structure, the front end of which has a hitch for connecting it to a source of draft power such as a tractor and the rear end of which has means for adjustably and detachably connecting it to a wide variety of agricultural tools including heavy tools such as plows, a pair of swingable crank axles mounted independently of one another and carrying ground wheels for supporting the rear of the carriage, means for adjusting each crank axle independently to vary the working depth of the carriage and to maintain it level when one ground wheel is lower than the other, a powerlift mechanism for each crank axle, and means for setting said powerlift mechanism into operation simultaneously.

5. A frameless, universal, implement carriage adapted to be connected to a forwardly located source of draft power such as the tractor from which it is to be controlled, comprising tool supporting draft bars having V-shaped notches in their rear ends to receive the supporting bar of a variety of agricultural tool units comprising a plurality of tools connected to a common supporting bar, crank axles and ground wheels for supporting the draft bars, means for swinging the crank axles to raise and lower the draft bars, and controlling means for the raising and lowering means.

6. The combination with an agricultural tool unit comprising one or more tools connected to a common supporting bar, of a frameless draft carriage detachably connected to said bar, said carriage comprising draft bars for connection to the supporting bar, supporting wheels movable vertically with relation to said bars, means for moving the wheels to raise and lower the tool unit and means for adjusting the wheels vertically to vary the working position of the tool unit.

7. The combination with an agricultural tool unit having one or more tools connected to a common supporting bar of a frameless draft carriage detachably connected to said supporting bar, said carriage comprising draft bars for connection to the supporting bar, crank axles and ground wheels for supporting said bars, a powerlift mechanism for each crank axle operated by power from its respective ground wheel, and controlling means for setting said powerlift mechanisms into operation simultaneously.

8. The combination with an agricultural tool unit comprising one or more tools connected to a common supporting bar, of a frameless draft carriage including draft bars detachably connected to said supporting bar, crank axles carrying ground wheels for supporting the draft bars, a powerlift mechanism for each crank axle operated by travel of its respective ground wheel, means for setting the powerlift mechanisms into operation simultaneously, and separate means for adjusting the position of each crank axle independently to vary the height of the sides of the bars when the tool unit is in working position.

9. The combination with an agricultural tool unit having one or more tools connected to a common supporting bar having squared portions, of a frameless draft carriage having draft bars provided with V-shaped notches in their rear ends to fit over two sides of the squared portions of the supporting bar, means for connecting the supporting bar to the draft bars, supporting wheels movable vertically with relation to the draft bars, and means for moving said wheels and holding them in adjusted position.

10. The combination with an agricultural tool unit having a pair of disc gangs connected to the arms of a U-shaped bar, of a draft carriage including draft bars detachably connected to said U-shaped bar, crank axles pivoted to the draft bars and carrying ground wheels for supporting said bars, powerlift mechanism operated by travel of the ground wheels for swinging the crank axles to raise and lower the draft bars, means for adjusting the crank axles to vary the height of the sides of the carriage, and an adjustable hitch device connected to the front ends of the draft bars by means of which they may be held in different adjusted positions about the axis of the pivots of the crank axles to the draft bars.

11. The combination with an agricultural tool unit having one or more disc gangs connected to a supporting bar of a draft carriage detachably connected to said bar, said carriage including draft bars, crank axles carrying ground wheels for supporting the draft bars, a powerlift mechanism for each crank axle for raising and lowering the bars, means for adjusting the crank axles to vary the height of the sides of the bars, and an adjustable hitch device connected to the front end of the draft bars by means of which they may be adjusted and held in different positions about the axis of the pivot of the crank axles to the draft bars.

In testimony whereof, I affix my signature.

JOSEPH E. BODA.